United States Patent [19]

Bemis

[11] Patent Number: 4,692,894
[45] Date of Patent: Sep. 8, 1987

[54] OVERFLOW/UNDERFLOW DETECTION FOR ELASTIC BUFFER

[75] Inventor: Gerald L. Bemis, Sunnyvale, Calif.

[73] Assignee: Advanced Micro Devices, Inc., Sunnyvale, Calif.

[21] Appl. No.: 683,434

[22] Filed: Dec. 18, 1984

[51] Int. Cl.[4] .......................... G06F 13/00; H04J 3/00
[52] U.S. Cl. ....................................... 364/900; 370/84
[58] Field of Search ................... 364/200, 900; 370/84

[56] References Cited

U.S. PATENT DOCUMENTS

| | | | |
|---|---|---|---|
| 3,421,147 | 1/1969 | Burton et al. | 364/900 |
| 3,447,135 | 5/1969 | Calta et al. | 364/200 |
| 3,588,840 | 6/1971 | Nomura et al. | 364/900 |
| 3,999,163 | 12/1976 | Levy et al. | 364/200 |
| 4,056,851 | 11/1977 | Hovagimyan et al. | 364/900 |
| 4,259,719 | 3/1981 | Edelman et al. | 364/200 |
| 4,322,844 | 3/1982 | Fellinger et al. | 370/84 |
| 4,378,588 | 3/1983 | Katzman et al. | 364/200 |

*Primary Examiner*—Gary V. Harkcom
*Assistant Examiner*—Randy W. Lacasse
*Attorney, Agent, or Firm*—Patrick T. King; Gerald B. Rosenberg; J. Vincent Tortolano

[57] ABSTRACT

An elastic buffer includes a memory array for storing received data, each location within the array having an associated cell storing a flag indicative of the most-recently performed (i.e., read or write) on the associated memory location. A potential write overflow of the memory is detected whenever a write attempt is made to a location whose flag indicates a write was most-recently performed. A potential read underflow is detected whenever a read attempt is made to a location when the flag associated with the location next to be read indicates a read was most recently performed. Also, a potential write operation of a memory location prior to the completion of a read on the next location within the array are also generates an overflow/underflow condition. Metastable logic state conditions within the array are avoided because the potential overflow/underflow conditions take cognizance of the finite propogation and setting times of signals within the array. The overflow/underflow signals generated within the array are provided to circuitry which controls the issuance of the underflow/overflow signal by the array. This circuitry includes a circuit which provides an extended time window to allow full decay or setting of any metastable signal applied thereto. The control circuitry ensures that an overflow/underflow detection signal issues only when data is in transit through the buffer.

9 Claims, 9 Drawing Figures

4,692,894

OVERFLOW/UNDERFLOW DETECTION FOR ELASTIC BUFFER

FIELD OF THE INVENTION

The present invention generally relates to elastic buffer type, data stream synchronizers that function to adjust the transmitted bit or word rate of a data stream to match a desired data receiver rate and, in particular, to a serial data stream synchronizer that avoids the potential occurrence of the metastable data logic states by maintaining and checking the status of buffered data as it is transferred through the synchronizer, providing for the recognition of a data overflow/underflow condition prior to its actual occurrence and providing for the mutual synchronization of the various signals that control the data stream synchronizer.

BACKGROUND OF THE INVENTION

High-speed data communication, such as exemplified in local area networks, must be synchronized as between the data transmitter and receiver, at least for the length of the minimum data group or packet sent, in order to be effective. Conventional asynchronous communications systems permit participating data transmitters and receivers to initiate and recognize the beginning of each data packet. They are thus capable of dealing variable time between transmission periods between data packets yet equally capable of becoming mutually synchronous relative to the currently transmitted data packet. Indeed, both conventional asynchronous and synchronous communication systems must be synchronous with respect to the transmission and reception of data within the data packet. That is, there must be a mutual, synchronous data transfer rate for the entire length of the transfer. Failure to maintain synchronism inevitably results in the miscommunication and, therefore, effective loss of the data.

A difference in data transmitter and data receiver transfer rates may arise due to a variety of reasons. Thermal drift in a base frequency oscillator circuit of either the transmitter or receiver as well as a simple misadjustment of one base frequency with respect to the other are but two common sources of a frequency difference.

A conventional elastic buffer is commonly used to adjust the data rate of a data stream so as to synchronize it with another desired data rate. An elastic buffer is a variant of the conventional first-in-first-out (FIFO) buffer. Elastic buffers significantly differ in that they allow for the reading and writing of data at different, relatively independent rates. Management of data within the elastic buffer is typically performed by maintaining address pointers that generally point to the memory locations within the buffer that contain the currently oldest written, but not yet read, and the currently oldest read, but not yet written, data in the buffer. These pointers progressively establish the memory locations within the buffer that are to be next read and written, respectively, as the data stream passes through. Since the current read and write memory locations are not fixed relative to one another, the buffer can elastically compensate for any difference in the transmitter rate that data is written to and the receiver rate that data is read from the buffer. Consequently, an elastic buffer can dynamically adjust the transfer rate of a data stream so as to effectively synchronize a data transmitter with a data receiver.

There are, however, a number of problems associated with the use of elastic buffers. One problem pertains to the need to ensure that data is read from the buffer in the same order that it was written to the buffer. Reading data that has not been written or writing data over data that has not yet been read destroys the integrity of at least the data packet being transferred. This is commonly known as a data overflow/underflow fault condition and is naturally to be avoided.

A closely related problem involves the occurrence of metastable logic states. Metastable states typically arise as data is written to and read from a memory location before the voltage potential representing the data written has properly propagated and settled. The voltage potential effectively read may not properly represent the data written and, by changing during the read operation, may propagate metastable logic states through the associated read circuitry. As the memory location has not been read before it was written, there is properly no indication of an overflow/underflow or other fault condition. Thus, the integrity of the data being transferred can be destroyed without notice, at least unless some other system of checking data integrity is provided.

A further difficulty involves the proper control of the elastic buffer. As there is no necessary phase relationship between the transmitter and receiver clock signals, they may be up to 180 degrees out of phase relative to one another. Consequently, events that are significant to the operation of the elastic buffer, such as initializing on the detection of the beginning of a data transfer, must be coordinated with respect to both the transmitter and receiver data rates and any current phase difference between them. The occurrence and propagation of metastable logic states throughout the control circuitry of conventional elastic buffers is, consequently, a commonly recognized problem.

SUMMARY OF THE INVENTION

Therefore, a purpose of the present invention is to provide a data stream synchronizer that overcomes most if not all of the problems of prior art elastic buffer synchronizers and, in particular, those discussed above.

This is attained in the present invention by providing a synchronizer for converting a first data stream provided at a first predetermined data rate to a second data stream provided at a second predetermined data rate, the synchronizer comprising elastic buffer means for receiving the first data stream and for providing the second data stream, and means for synchronizing the control of the elastic buffer with the first and second data rates so as to avoid the occurrence and propagation of metastable logic states.

Accordingly, an advantage of the present invention is that it provides for the adjustment of the data rate of a data stream as received to properly synchronize it with the data read rate of the receiver.

Another advantage of the present invention is that it provides for the reliable detection of overflow/underflow conditions as may occur during the transfer of data.

A further advantage of the present invention is that it effectively prevents the occurrence of metastable logic states as occasioned by the near simultaneous writing and reading of a memory location within the data stream buffer.

Still another advantage of the present invention is that it provides for the complete synchronization of control signals with regard to both the transmitter and receiver clock signals so as to prevent the occurrence of metastable states in the data stream synchronizer control circuitry.

Yet another advantage of the present invention is that it is particularly adaptable to a wide variety of high-speed data communications applications and, in particular, to high-bandwidth, serial data stream local area network systems.

BRIEF DESCRIPTION OF THE DRAWINGS

These and other attendant advantages of the present invention will become apparent and readily appreciated as the same becomes better understood by reference to the following detailed description when considered in connection with the accompanying drawings, in which like reference numerals designate like parts throughout the figures thereof, and wherein.

DETAILED DESCRIPTION OF THE INVENTION

I. System Overview

The present invention is exemplified in its preferred embodiments as an integral part of an encoder/decoder, or ENDEC, system component of a local area network node. As will become readily apparent to those skilled in the art, the preferred embodiment is only representative of the many applications that the teachings of the present invention can be applied. Accordingly, the detailed illustrative embodiment of the present invention disclosed herein is provided particularly as being its currently considered best mode of practicing the present invention.

Figure 1:
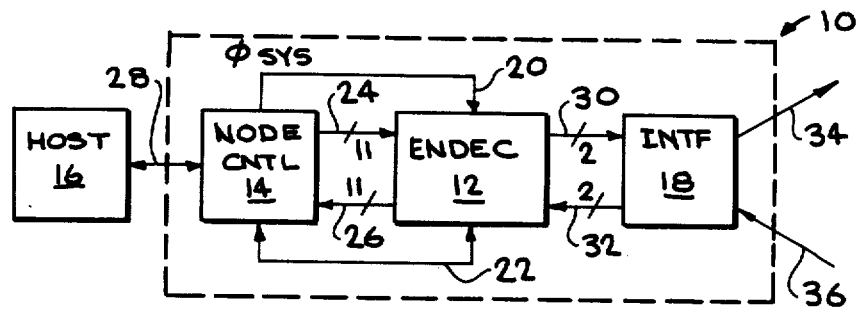
FIG. 1 is a simplified block diagram of an exemplary local area network node and its associated host.

FIG. 1 illustrates the typical manner of utilizing a local area network node 10 to interconnect a host computer system 16 with a physical network media 34, 36. Typically, the node 10 will include a node controller 14, an ENDEC 12 and an interface unit 18 as integral system components. The host computer 16 typically communicates with the node controller 14 of the node 10 over a bidirectional data bus 28. The node controller 14, in turn, transfers data to and from the ENDEC 12 over the data busses 24, 26, respectively. In addition, the node controller 14 controls and determines the status of the ENDEC 12 by means of the control bus 22. A system clock, $\phi_{SYS}$, is provided on the clock line 20 to the ENDEC 12 to ensure that the system components are properly synchronized.

The ENDEC 12 functions to prepare the raw transmitter data provided by the node controller 14 for transmission to the interface system component 18 over the serial data bus 30 and, subsequently, onto the network media 34. The ENDEC 12 further functions to recover data received from the network media 36 via the interface system component 18 and the serial data bus 32. This recovered data is then transferred to the node controller 14 over the return data bus 26.

The interface system component 18 functions to provide a physical interconnect between the node 10 and network media 34, 36. As such, the interface 18 may simply be a coaxial "T" connector, for example. Depending on the nature of the network media 34, 36, however, the interface may perform a more complex function. Where the media 34, 36 is an optical fiber communications cable, the interface 18 also preferably includes an electro-optic transmitter and receiver.

Finally, the network media 34, 36 itself is preferably only a passive single high-speed serial data bus that physically interconnects each of the nodes 10. The topology of the network, i.e., ring, redundant loop, or linear, is thus established by how the nodes are interconnected, in terms of nearest neighbor relationships, by the physical network media.

II. Network Protocols

There are a number of somewhat different networking protocols, or systematic procedures of operation, that may be implemented to control the overall operation of the network. A design choice in the assemblage of the network is the selection of one of these protocols for implementation. One exemplary protocol, and the one preferably implemented in a network utilizing the present invention, is a token-passing, ring topology network protocol wherein communication between nodes is by means of data packets. A general description and discussion of this protocol and its principles of operation as well as other conventional protocols may be had by reference to "New Standards for Local Networks Push Upper Limits for Light Wave Data," S. Joshi et al., *Data Communications*, July 1984, pp. 127–38.

In brief, the exemplary protocol calls for the ordered access of each node to the entire network. A node having the right to access the network, i.e., the current "token" holder, may initialize a network communication sequence wherein a number of data packets are exchanged with one or more other network nodes. At the conclusion of the communication sequence, the "token" is passed to the next successive node of the network. Another communication sequence may then be initiated by the "token" holder.

Typically, the data packets are themselves only a part of a continuous data stream that traverses the network. As will be described in greater detail below, each packet includes a header portion, a data body portion, and a trailer portion. The packets may be separated from one another in the data stream by a filler code that acts to maintain status communication between all of the nodes by reflecting the line-state of the network even though no data packets are being transferred. The most primitive or basic protocol functions performed by a node include recognizing the current line-state of the network and asserting requests with respect to the line-state.

III. ENDEC Component System

1. Architecture and Data Flow Organization.

Figure 2:
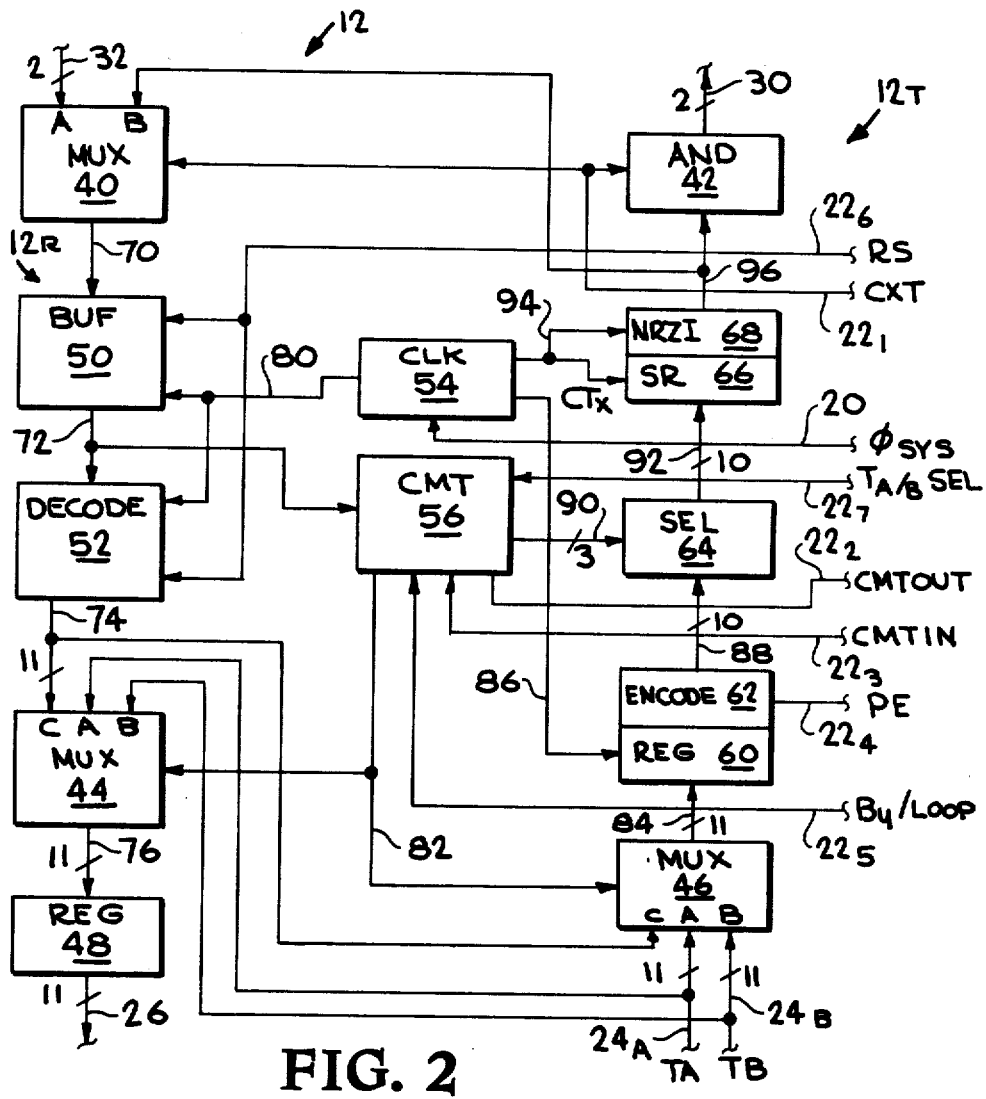
FIG. 2 is a block diagram of the principle components of an ENDEC in accordance with the preferred embodiment of the present invention.

The present invention provides an encoder/decoder component system fully capable of performing all of the required functions of an ENDEC 12 in a local area network node. Accordingly, FIG. 2 provides a block diagram of the preferred embodiment of an ENDEC 12 consistent with the present invention.

The ENDEC 12 includes two major subsections 12$_T$, 12$_R$. The first is a transmitter subsection 12$_T$ including a multiplexer 46, register 60 and encoder 62, selector 64, serial shift register 66, non-return-to-zero invert-on-ones (NRZI) converter 68, and an AND gate 42. The receiver subsection 12$_R$ includes a multiplexer 40, buffer 50, decoder 52, multiplexer 44, and register 48. These two subsections are jointly controlled by a command management (CMT) unit 56 and a clock unit 54.

In greater detail, the ENDEC 12 may receive two separate parallel data streams, T$_A$, T$_B$, over the respective transmitter input lines 24$_A$, 24$_B$. This parallel data, as provided by the node controller 14, preferably includes a single data byte, high and low order nibble control/data bits, and a parity bit. The multiplexer 46 receives the two transmitter parallel data streams on its A and B inputs, and, further, an equivalently formatted received data word stream on the multiplexer 46 C input as provided by the receiver subsection via bus 74. The selection of one of the three input parallel data streams is in response to control signals provided on control lines 82 by the CMT 56. The selected data is transferred by the multiplexer 46 over the parallel data bus 84 to the register 60 where it is latched in response to a clock signal provided by the clock unit 54 on line 86. Each parallel data word is thus sequentially provided via the register 60 to the encoder circuit 62 for encoding.

In accordance with the preferred embodiment of the present invention, the encoder 62 implements a 4B/5B encoding scheme wherein each high and low order nibble of the data byte is encoded in combination with its respective control/data bit to provide 2 five-bit code symbols. Table I sets forth each unencoded data nibble, as well as its preferred corresponding encoded bit group and code symbol assignment. Preferably each data packet header includes a JK code symbol pair as a start delimiter followed by a data body of data code symbols, further followed by a trailer beginning with a terminator code symbol and, optionally, a following control symbol. The filler portion of the data stream between data packets is itself simply a sequence of line-state symbols that appropriately indicate the current status of the network medium.

TABLE I

| Symbol Group | Control Data Bit | Data Nibble (Hex) | Encoded Bit Group | Symbol | Assignment |
|---|---|---|---|---|---|
| Line-State Indicators | 1 | 0 | 00000 | Q | Quiet |
| | 1 | 7 | 11111 | I | Idle |
| | 1 | 4 | 00100 | H | Halt |
| Starting Delimiters | 1 | C | 11000 | J | Start of packet header |
| | 1 | 3 | 10001 | K | |

TABLE I-continued

| Symbol Group | Control Data Bit | Data Nibble (Hex) | Encoded Bit Group | Symbol | Assignment |
|---|---|---|---|---|---|
| Data Symbols | 0 | 0 | 11110 | 0 | |
| | 0 | 1 | 01001 | 1 | |
| | 0 | 2 | 10100 | 2 | |
| | 0 | 3 | 10101 | 3 | |
| | 0 | 4 | 01010 | 4 | |
| | 0 | 5 | 01011 | 5 | |
| | 0 | 6 | 01110 | 6 | |
| | 0 | 7 | 01111 | 7 | |
| | 0 | 8 | 10010 | 8 | |
| | 0 | 9 | 10011 | 9 | |
| | 0 | A | 10110 | A | |
| | 0 | B | 10111 | B | |
| | 0 | C | 11010 | C | |
| | 0 | D | 11011 | D | |
| | 0 | E | 11100 | E | |
| | 0 | F | 11101 | F | |
| Ending Delimiter | 1 | D | 01101 | T | Termination |
| Control Indicators | 1 | 1 | 00111 | R | Reset |
| | 1 | 9 | 11001 | S | Set |
| Physical Error | 1 | F | | Phy-I | Physical Invalid |
| | 1 | E | | J. Phy-I | Smash JK |
| Misc. Group Symbols | 1 | 2 | | X | Not defined; treat as halt. |
| | 1 | 5 | | H | Improperly transmitted; treat as halt. |
| | 1 | 6 | | X | Not defined; treat as halt. |
| | 1 | 8 | | V | Violation |
| | 1 | A | | H | Improperly transmitted; treat as halt. |
| | 1 | B | | H | Improperly transmitted; treat as halt. |

The encoder 62, in the process of encoding each data byte also regenerates a parity bit that is then compared to the parity bit supplied with the original parallel data word to determine whether an error has occurred in the transfer of the parallel word from at least the node controller node 14 to the ENDEC 12. The parity error, if present, is reported back to the node controller 14 over the control bus line 22$_4$.

The encoded data is passed via the encoded data word bus 88 to a selector circuit 34 where, nominally, it is further passed via the parallel bus 92 to the serial shift register 66. As will be described in greater detail below, the CMT unit 56 may direct, via selector control lines 90 that the selector 64 generate and select line-state and, possibly, error code symbols for subsequent transmission. In any case, the code symbols received by the serial shift register 66 are parallel-to-serial converted in response to a transmitter clock signal CTx provided by the clock unit 54 over clock line 94. The serialized data provided by the serial shift register 66 is further converted by a conventional non-return-to-zero invert-on-ones (NRZI) converter 68 to the corresponding preferred serial format. The resulting NRZI data is then provided to the AND gate 42 via the serial data line 96. The serial data stream is preferably further converted to a conventional differential signal by the AND gate 42 and provided on the serial data line pair 30 to the interface system component 18 for transmission.

The receiver subsection $12_R$ of the ENDEC 12 selectably receives serial data streams from the interface system component 18 over a differential signal serial data line pair 32 and from the transmitter subsection $12_T$ over line 96. The multiplexer 40 preferably includes a conventional differential signal receiver for converting the input serial data stream received from the interface 18 into a standard non-differential signal. The multiplexer 40, as directly controlled by the node controller 14 via the connection control bus line $22_1$, selects between its two available input data streams and provides the selected received serial data stream to the buffer 50 over the serial data line 70.

The buffer 50 is preferably of a type generally known as an elastic buffer. Such buffers typically include a buffer memory and provide for the asynchronous reading and writing of data contained therein. Thus, variations in the rates at which data is received written into the buffer and subsequently read out may be tolerated.

The buffer 50 preferably also includes a phase-lock loop and data separator circuit to reconstruct separately the data and a received data clock signal CRx from the received NRZI data stream. The received data clock signal CRx corresponds to the transmitter clock signal of the node 10 transmitting the data currently being received, and is used to synchronize the writing of received data into the buffer memory of the buffer 50. The buffer 50 also receives the transmitter clock signal CTx from the clock unit 54 over line 80 to synchronize the reading of data from the buffer 50 with the remainder of the receiver subsection of the ENDEC 12.

The received data, as it is read from the buffer 50, is provided to the decode unit 52 over the serial data line 72. As will be discussed in greater detail below, this serial data is also passed to the CMT unit 56 for monitoring of the current line-state. The decode unit 52, synchronous with the data read from the buffer 50, reconstructs parallel encoded data words from the serial data stream. The decode unit 50 then sequentially decodes each of them to provide a stream of decoded 11-bit-wide parallel data words on the parallel received data bus 74.

The parallel decoded data stream is in turn provided to the multiplexer 44 as one input thereto. Two additional parallel data word inputs to the multiplexer 44 are obtained from the two transmitter lines $24_A$, $24_B$, respectively. The multiplexer 44 is controlled by the CMT unit 56 to select between its three inputs. The selected received data word stream is provided by the multiplexer 44 on the parallel data bus 46 to the register 48 where it is buffered prior to transfer to the node controller 14 via the parallel receive data bus 26.

The CMT unit 56 of the ENDEC 12 is itself directly controlled by the node controller 14 via the CMTIN lines $22_3$, the bypass/loop control lines $22_5$ and the transmitter A/B source select line $22_7$. The CMTIN control lines $22_3$ permit the node controller 14 to specify to the CMT unit 56 that it is to operate the selector 64 of the ENDEC 12 so as to implement specific primitive local area network protocols to establish the node 10 as, for example, a peer, master or slave unit. The status of the CMT unit 56, as well as the line-state of the network as perceived by the CMT unit 56, is reported back to the node controller 14 via the CMTOUT lines $22_2$. The CMTIN control lines $22_3$ also permit the node controller 14 to functionally disable the CMT unit 56 so that no primitive protocols are implemented. The nature and purpose of the preferred primitive protocols, as well as the operation of the CMT unit 56, will be described in greater detail below.

The bypass/loop control lines $22_5$, transmitter A/B source select line $22_7$ and the connector control line $22_1$ together permit the node controller 14 to select the data stream paths through both the transmit and receive subsections $12_T$, $12_R$ of the ENDEC 12. Significantly, this allows the node controller 14 to configure the data paths through the ENDEC 12 to implement a high degree of selfdiagnostic capabilities within the node 10. That is, the node controller 14 may bypass the majority of the ENDEC 12 by routing a transmitter parallel data stream from either of the transmitter input lines $24_A$, $24_B$ through the multiplexer 44 and register 48 directly back to the node controller 14, thereby allowing direct testing of the parallel data path between the node controller 14 and the ENDEC 12. Substantially all of the internal circuitry of the ENDEC 12 may also be tested by the node controller 14 by appropriately selecting a loop-back path from the output of the NRZI unit 68 to the multiplexer 40 via the serial data line 96 and back through essentially the entire receive subsection of the ENDEC 12.

Further, the node controller 14 may elect to allow another node of the local area network to evaluate the operation of the ENDEC 12 and all the intervening components of the network. That is, the node controller 14 may select via the bypass loop-back control lines $22_5$ to configure the multiplexer 46 to select the decoded receive parallel data from the decode unit 52 to be passed by the multiplexer 46 as the parallel data to be encoded, serialized and subsequently retransmitted onto the network media. In this manner, large sections of the network can be evaluated so as to determine those elements that, for example, contribute to the progressive degradation of data as it's passed through the corresponding section of the network.

2. Buffer and Decode Section Detail

Figure 3:
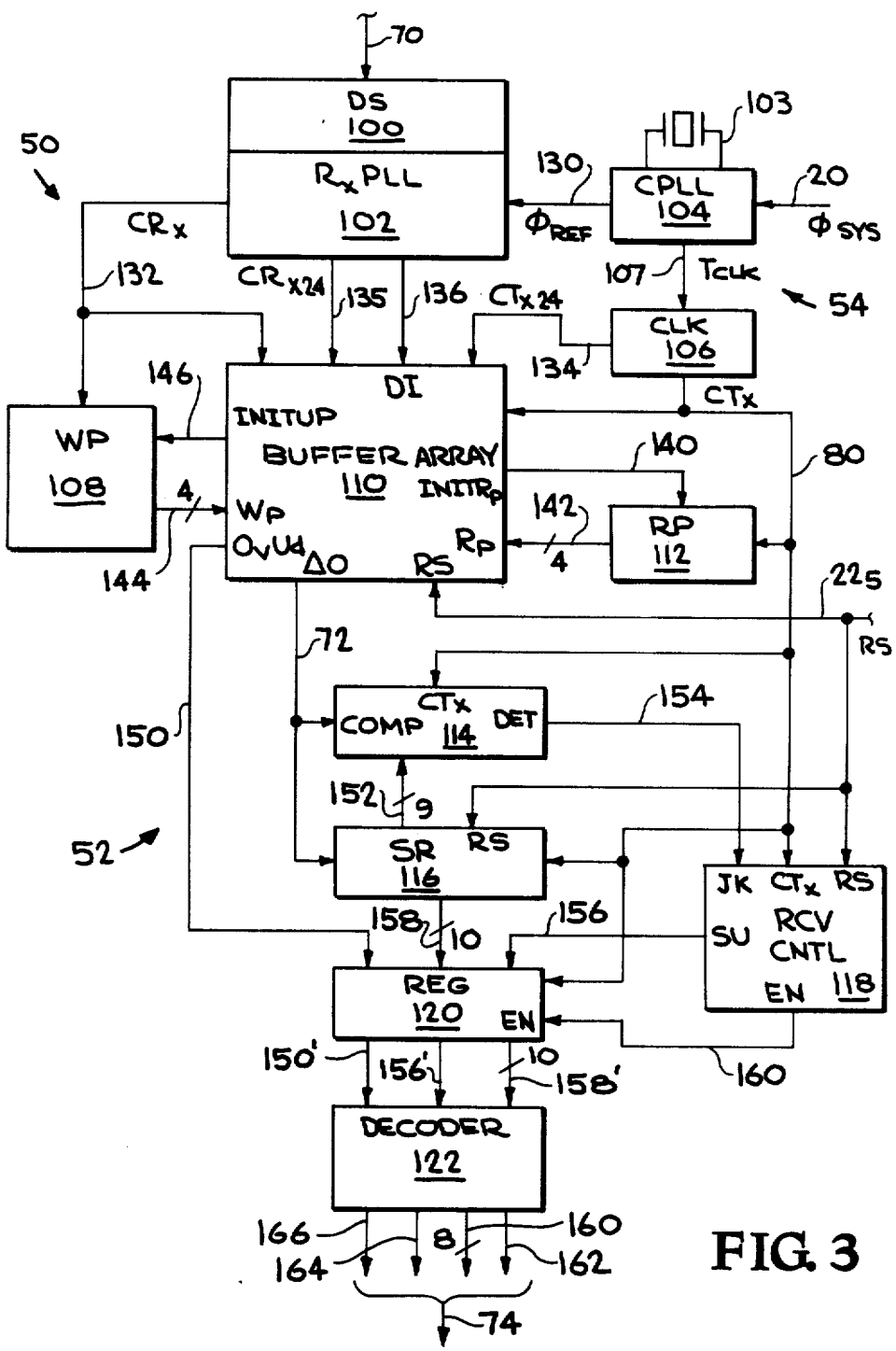
FIG. 3 is a block diagram of the preferred buffer and decoder components of FIG. 2.

Referring now to FIG. 3, the preferred implementation of the buffer 50 and decode unit 52 are shown. In accordance with the preferred embodiment of the present invention, the serial received data stream provided on line 70 by the multiplexer 40 is a non-differential serial signal containing non-return-to-zero inverton-ones encoded data. Thus, to recover the data from the serial data stream provided, a conventional data separator 100 and receiver phase-lock loop 102 are employed. A reference frequency, $\phi_{REF}$, is provided by the clock unit 54 phase-lock loop 104. Based on this reference frequency, the data separator 100 and receive phase-lock loop 102 locks onto and regenerates separately the received data clock signal CRx and the encoded serial data stream on lines 132 and 136, respectively.

As generally indicated above, the data stream containing data packets may be received by the ENDEC 12 at a rate that differs by a small but significant amount from the transmit clock signal CTx as directly derived from the system clock $\phi_{SYS}$ signal. In the present invention, a serial data stream buffering and resynchronization function is accomplished through the use of a dual ported asynchronous or elastic buffer. Preferably, the elastic buffer includes a linear memory array within a buffer array 110 with separate write and read counter/pointers 108, 112. The asynchronous reading and writing of data to the linear memory array of the buffer array 110 is accomplished by utilizing the write counter/pointer 108, synchronous with the CRx signal, to sequentially point to the next available memory cell of the linear memory array. This permits serial data bits to be written to the buffer array at the rate they are received. The read counter/pointer 112 also sequentially points to memory cells of the linear memory array to allow the CTx signal synchronous reading of buffered serial data bits. Thus, the reading of serial data from the buffer 50 is synchronous with respect to the operation of the decode unit 52 and the node controller 14.

The length of the linear memory array of the buffer array 110 is effectively made infinite by specifying that the counters of both the write pointer 102 and read pointer 112 are reset to zero as they are respectively clocked past pointing at the last memory cell of the buffer array. However, where there is too great a disparity in the rates of reading and writing data from and to the buffer array 110, an overflow/underflow condition occurs. That is, both the write pointer 102 and read pointer 112 effectively point to the same memory cell of the buffer array 110 resulting in a compromise of data integrity. While the particularly preferred manner of detecting the imminent occurrence of the overflow/underflow condition will be described below, it is sufficient for purposes of the present invention merely that the elastic buffer 108, 110, 112 detects this condition and provides an appropriate overflow/underflow (OvUd) signal on line 150 to the decoder 52.

The serial data stream, as synchronized by the buffer array 110 to the ENDEC transmitter clock signal CTx, is provided over line 72 to the decode unit 52. Preferably, the decode unit 52 includes a comparator 114, serial-to-parallel shift register 116, a receiver control unit 118, a register 120, and, finally, a decoder 122. In greater detail, the serial data stream including data packets is serially clocked from the buffer array 110 into the shift register 116 in response to the transmitter clock signal CTx pulses provided on line 80. As the encoded data words of the data stream are ten bits long in accordance with the preferred embodiment of the present invention, the shift register 115 is correspondingly ten bits wide. The comparator 114 has, as one input thereto, the single data bit present on the serial data line 72 during each cycle of the transmitter clock signal CTx. The nine low-order bits simultaneously present in the shift register 116 are also provided to the comparator 114 by the partial parallel shift register output comparator input bus 152. Thus, the comparator 114 samples a full ten-bit-wide data word during each transmitter clock cycle, one clock cycle prior to the equivalent word being fully shifted into the shift register 116. The comparator 114 thus preferably compares the encoded potential data word presented to it with the code equivalent of the start delimiter JK code symbol pair. Detection of the JK symbol code pair by the comparator 114 is significant in that it signals the imminent presence of a known data word properly aligned in the shift register 116. Upon detecting a JK code symbol pair, the comparator 114 provides a detect signal over line 154 to the receiver control unit 118.

The receiver control unit 118 itself preferably includes a bit counter whose capacity corresponds to the bit length of the encoded data words and counts in response to each cycle of the transmitter clock signal CTx, as provided on line 80. Reception of the JK detect signal from the comparator 114 causes the receive control unit 118 to reinitialize its bit counter and to issue a latch-enable signal to the register 120 over line 160 during the next transmitter clock cycle. This has the desired effect of latching the properly aligned full ten-bit-wide data word present in the shift register 116 as provided over the parallel data bus 158, into register 120. Subsequent serial data words are partitioned in alignment with their preceding JK code symbol data word by the receiver control unit 118. That is, the bit counter of the receive control unit 118 cycles to its full capacity count as each data word is serially shifted into the shift register 116 and into alignment with its preceding JK code symbol pair. The bit counter then preferably self-resets and causes the receive control unit 118 to issue its latch enable signal on line 160. Thus, the serial data stream is successively partitioned into encoded parallel data words and successively passed to the register 120 and the decoder 122.

A error condition particular to local area networks arises when data packets are transmitted onto the network such that they overlap one another. This condition is generally referred to as a collision or smash condition. In accordance with the present invention, a potential smash condition is detected by the receiver control unit 118 whenever a JK code symbol pair detect signal is received from the comparator 114 yet the bit counter of the receive control unit 118 is not at its capacity count. This indicates that the currently detected JK code symbol pair is out of alignment with the JK code symbol pair last previously processed through the decode unit 52. In response, the receive control unit 118 issues a smash condition detected signal over line 156 to the register 120, reinitializes its bit counter to adjust the partitioning of data words into alignment with the presently detected JK code symbol pair and enables register 120 to latch in the smash condition as a separate bit in the register 120 along with the JK code symbol pair. The state of the overflow/underflow (OvUd) signal, as provided on line 150, is also latched into the register 120 as a further parallel bit therein.

The register 120 provides its latched data word of code, data or line-state symbols to the decode 122 by way of the parallel data word bus 158'. Similarly, the overflow/underflow and smash condition error bits are passed to the decoder 122 over the bit lines 150', 156', respectively.

The decoder 122, in turn, decodes its inputs, preferably in accordance with Table I. That is, the high and low order five bits of the encoded data word are decoded to their respective unencoded binary nibbles and provided on the parallel data bus 160. Their respective decoded control/data indicators are provided on their respective high and low order control/data bit lines 164, 166. Finally, the decoder 122 further generates a parity bit corresponding to the value of the decoded data byte and provides it on the parity bit line 162. Consequently, the desired parallel data stream is reconstructed by the decoder 122 and provided on the parallel received data bus 74 and, as earlier noted, provided to the multiplexer 44, as shown in FIG. 2.

The decoder 122 advantageously further functions to ultimately provide the node controller 14 with an direct indication of the occurrence of both the overflow/underflow and smash error conditions. That is, the decoder 122 alters the otherwise normal decoding of the encoded data word provided on parallel data bus 158' whenever an error data bit is provided on the error bit lines 150', 156'. In particular, the decoder 122 effectively abandons the decoding of the encoded data word whenever the overflow/underflow error bit is present. Instead the decoder 122 effectively decodes a pair of physical-invalid error symbols and provides the corresponding parallel decoded data word on the parallel data bus 74. That is, the decoder 132 provides high and low order nibbles "F", "F" hex with both control/data bits=1, thus indicating that the integrity of the data in the current data packet has been compromised and should be utlimately abandoned by the node controller 14.

Similarly, the decoder 122 alters its decoding of the encoded JK code symbol pair when the smash condition bit is provided on the error bit line 156'. Instead of decoding the JK code symbol pair to the binary high and low order nibbles "C" and "3" hex with both control/data bits=1, the decoder 122 preferably decodes the smash JK or J physical-invalid condition as high and low order nibbles "E" and "3" hex with both control/data bits=1. Consequently, the decoded data word ultimately provides the node controller 14 with the specific information that both a smash condition has occurred and a new data packet is now being received. This is significant in that it allows the node controller to effectively abandon the overlapped and, therefore, incomplete data packet while being properly informed that a new and potentially error-free data packet is being transferred from the ENDEC 12. Further significantly, the effective encoding of the smash condition into the otherwise decoded JK code symbol pair equivalent relieves the need to provide an additional physical interconnect control line between the ENDEC 12 and the node controller 14, thus simplifying the physical interface between the two system components without loss of function or flexibility.

2.a. Preferred Elastic Buffer Design

Figure 4:
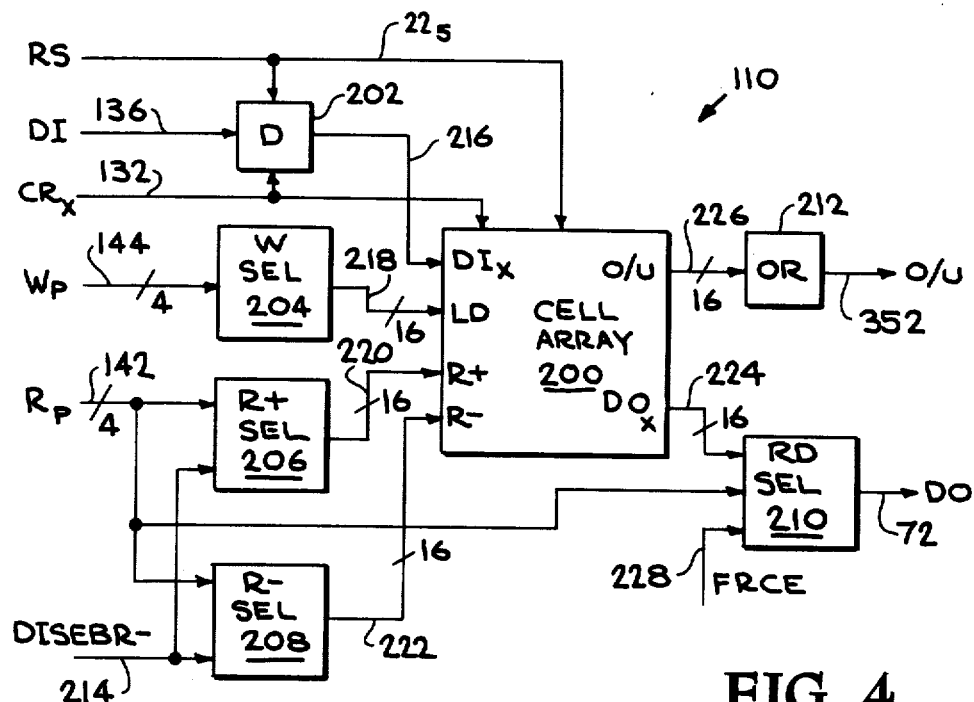
FIG. 4 is a block diagram of the preferred buffer element of FIG. 3.

As noted above, a conventional elastic buffer may be utilized to perform the functions of the write pointer 108, buffer array 110, and read pointer 112. However, the preferred design of the elastic buffer 108, 110, 112 is detailed in FIGS. 4-7. In particular, the principal elements of the buffer array 110 are shown in FIG. 4. The cell array 200 of the buffer array 110 is preferably a linear array of separately adressable cell units $200_n$, an exemplary one being shown in FIG. 5. The cell array 200 is analogous to a first-in, first-out (FIFO) memory except that it is asynchronously read and written as permitted by the control circuitry associated with the buffer array 110 and shown in FIGS. 6-7.

For the preferred embodiment of the present invention, the cell array 200 preferably has a minimum length sufficient to progressively buffer an entire data packet that is simultaneously written to and read from the cell array 200 while tolerating the greatest disparity acceptable between the serial data stream receive and transmit clock rates CRx, CTx. Thus, for an exemplary data packet consisting of 9,000 code symbols (or 45,000 serial bits in length), a transmitter clock signal (CTx) base frequency of 125 mhz with a tolerance value specified at ±0.005 percent and, therefore, a maximum CTx to CRx frequency variance of 0.01 percent, the cell array 200 must provide for an elasticity of ±4.5 serial data bits minimum. In practical terms, this translates into an elastic buffer cell array 200 having a minimum of ten cell units $200_n$ to permit the buffering of an entire data packet without the possibility of incurring a data overflow/underflow error condition. However, for reasons that will become apparent below, the preferred cell unit length of the cell array 200 is 16.

Figure 7:
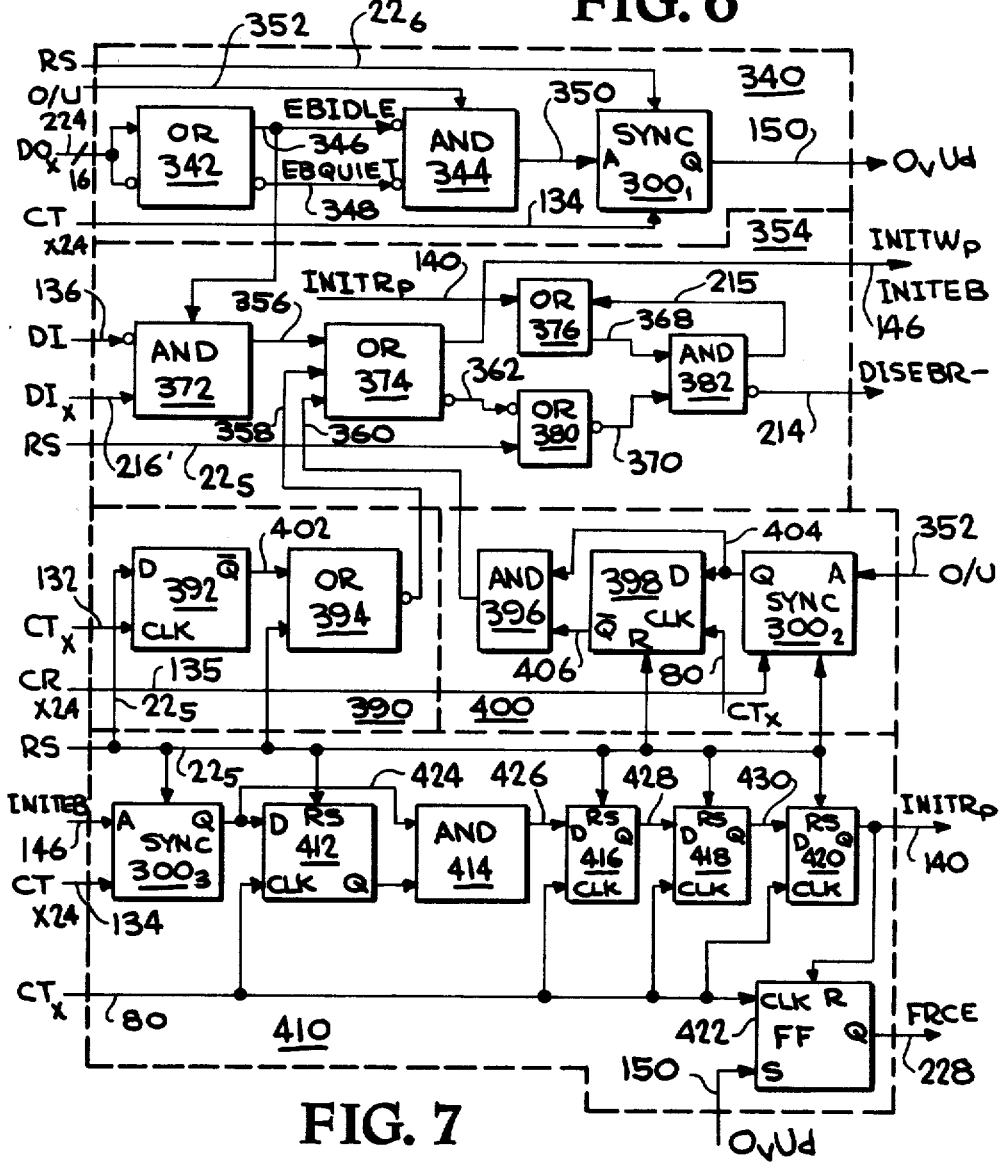
FIG. 7 is a detailed block diagram of the control circuitry utilized in the implementation of the buffer element of the preferred embodiment of the present invention.

In operation, the write pointer 108 of FIG. 3 is initialized by an INITWp signal provided by the control circuitry of FIG. 7 on control line 146. The binary counter of the writer pointer 108 is accordingly reset. As serial data is received by the buffer array 110 on the DI line 136, the binary counter of the write pointer 108 sequentially increments the write pointer count provided to the buffer array 110 via the pointer lines 144. That is, the count of the write pointer 108 is incremented with each cycle of the receive clock signal CRx as provided on the line 142 and is, therefore, synchronous with the provision of the serial data to the buffer array 110 on the DI line 136.

Figure 5:
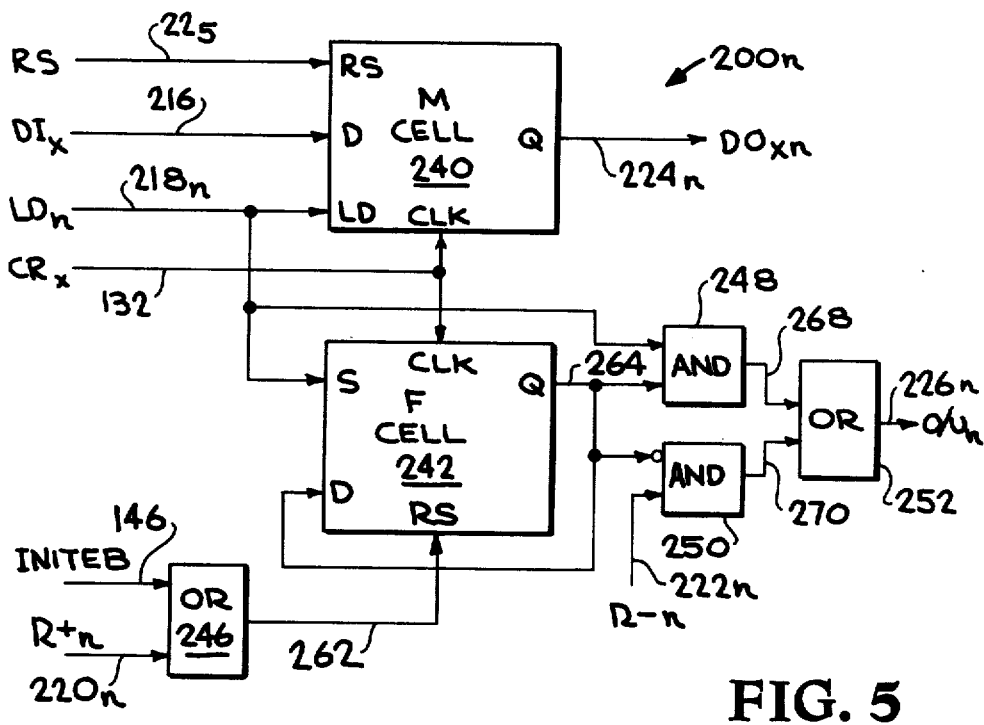
FIG. 5 is a block diagram of the preferred memory element of the buffer element of FIG. 4.

Referring again to FIG. 4, the writer pointer count is provided via the write count lines 144 to the write cell unit selector 204. Preferably, this selector 204 is a binary 4- to 16-line decoder with each of its 16 output lines 218 connected to a respective cell unit $200_n$. As shown in FIG. 5, each of these lines $218_n$ is connected to a memory cell 240 within their respective cell units $200_n$ to provide a data load enable signal. Serial data from the DI line 136 is buffered, preferably by a D flip-flop clocked from the CRx clock line 132, and provided in common on a DIx line 216 to each memory cell 240 of the respective cell units $200_n$. Thus, as a cell unit $200_n$ is selected by an appropriate signal on their load select line $218_n$, the corresponding memory cell 240 loads the serial data bit, as present on the DIx line 216, into the memory cell 240 synchronous with the receive clock signal CRx as provided on the line 132. The single data bit stored in the memory cell $240_n$ is thus made available on its respective output line $DOx_n$ $224_n$.

Considering again FIG. 3, the buffer array 110 and the read pointer 112 operate similarly to provide for the reading of data from the cell array 200. The binary counter of the read pointer 112 is at least initially reset in response to the INITRp signal provided on the control line 140 by the control circuitry of FIG. 7. Subsequently, the binary count increments in response to the transmitter clock signal CTx as provided on the clock line 80. Again referring to FIG. 4, the binary read pointer count is provided to the buffer array 110 on the read count lines 142. In particular, the read count is provided to the read cell unit selector 210, preferably including a conventional 16-to-1 multiplexer circuit. The respective $DOx_n$ lines $224_n$ from the memory cells $240_n$ are provided as the respective data inputs to the read selector 210. Thus, the data of one memory cell 240 is selected in response to the read pointer count and is transferred to the data-out (DO) line 72.

2.b. Overflow/Underflow Detection

Referring again to FIG. 5, detection of overflow/underflow conditions during the operation of the buffer array 110 is accomplished through the use of a flag cell 242 provided in each respective cell unit $200_n$. Similar to the memory cell 240, the flag cell 242 is capable of storing a single bit of information. However, the particular information stored relates to whether a read or write operation was the last such operation performed with regard to its respective memory cell 240.

For a given unit cell $200_n$, selection of the memory cell 240 by the write select circuit 204 provides a load signal on its corresponding load signal line $218_n$. This load signal is also applied to the data set input of the flag cell 242. Thus, as the memory cell 240 is written with data from the DIx line 216 by a transition of the receive clock signal CRx on the line 132, the flag cell 242 is simultaneously set. The output of the flag cell 242 on output line 264 is fed back to the data input of the flag cell 242 thereby maintaining the current state of the information stored in the flag cell through subsequent transitions of the receive clock signal CRx.

A write overflow condition will arise whenever the memory cell 240 of a cell unit $200_n$ is written to when its corresponding flag cell 242 is already set. This combination of conditions is detected by the AND circuit 248 taking as its inputs the load signal provided on the line $218_n$ and the output of the flag cell 242 as provided on its output line 264. The resulting signal is provided on the AND 248 output line 268 to the OR gate 252 and immediately to the overflow/underflow (O/$U_n$) line $226_n$ of the cell unit $200_n$. As shown in FIG. 4, the O/$U_n$ signals provided by the cell units $200_n$ on their respective lines 226 are ORed together by the OR gate 212. Thus, should any one of the cell units $200_n$ detect a write cell array overflow condition, a corresponding overflow/underflow condition signal (O/U) will be provided on the cell array overflow/underflow line 352. This signal is, in turn, provided to the control circuitry of FIG. 7 that ultimately determines whether an overflow/underflow condition detection (OvUd) signal will be issued by the buffer array 110.

A read underflow condition is detected in a similar manner. Referring first to FIG. 4, the read pointer count as provided on lines 142 is provided to a read+ selector 206 and read− selector 208 in addition to the read cell unit selector 210. The read+ selector 206 and read− selector 208 both also preferably include 4- to 16-line decoder circuits. The three read selectors, however, are distinguished in that for a given read pointer count, the selectors 206, 208, 210 will select three consecutive cell units $200_n$ of the cell array 200. In particular, the readselector 208 will select, by way of one of its output lines $222_n$ the cell unit $200_n$ that will be selected by the read selector 210 upon the next increment of the read pointer count. The read+ selector 206 similarly selects, by way of one of its output lines 220 the cell unit $200_n$ selected by the read selector 210 in response to the immediately preceding read pointer count.

Referring again to FIG. 5, selection of the cell unit $200_n$ by a signal on the R-$_n$ select line $222_n$ effectively tests the status of the flag cell 242 of the cell unit $200_n$ preceding the one currently being read as selected by the read selector 210. That is, application of the R-$_n$ select signal to the AND gate 250, having the output of the flag cell 242 via the output line 264 as its other input, results in the transfer of the complemented current status of the flag cell 242 to the overflow/underflow (O/$U_n$) line $226_n$ of the cell unit $200_n$ via the line 270 and the OR gate 252. If the output of the flag cell 242 is set indicating that a write operation was last performed on its associated memory cell 240, then no cell unit overflow/underflow (O/$U_n$) signal is provided on O/$U_n$ line $226_n$. However, should the output of the flag cell 242 be reset, AND gate 250 and OR gate 252 will act to provide a cell unit overflow/underflow signal on line $226_n$ and, ultimately, on the cell array overflow/underflow line 352. Consequently, it is the status of the flag cell 242 of the cell unit $200_n$ that is next to be read that determines whether an overflow/underflow condition is considered to exist.

The read+ selector 206, in contrast, adjusts the status of the flag cell 242 of the cell unit $200_n$ last previously read. The R+$_n$ select signal from the read+ selector 206 provided on the line $220_n$ is gated by the OR gate 246 over line 262 and applied to the status reset input of the flag cell 242 as the memory cell 240 of the next cell unit $200_n$ is read. Consequently, a write operation directed to a cell unit $200_n$ prior to the completion of a read operation on the next cell unit $200_n$ in the linear array 200 will result in the effective detection of an overflow/underflow condition. Thus, in accordance with the preferred embodiment of the present invention, an overflow/underflow condition is stipulated to occur whenever read and write operations occur near simultaneously on adjacent cell units $200_n$ of the cell array 200.

Accordingly, the minimum number of cell units in the cell array 200 must be increased by two over the number previously determined to be required. In the example above for the case of the preferred embodiment, the minimum number becomes twelve. However, for simplicity of construction in view of the use of 4-bit write and read pointer counters, the preferred number of cell units $200_n$ is sixteen.

A significant virtue of the preferred overflow/underflow detection scheme described above is that it avoids metastable logic state conditions. That is, in conventional elastic buffers, an overflow/underflow condition may not be detected until the same cell unit is addressed for both reading and writing. There are, however, finite propagation and settling times associated with signals in all electronic circuits. Until all relevant signals have propagated and settled, the combinatorial output of logic gates affected may not properly reflect the input conditions of the circuit. Relevant to the function of an elastic buffer, metastable states may result in the reading and writing of incorrect data as well as the improper detection or failure to detect overflow/underflow conditions. This metastable state problem is completely avoided through the use of the preferred embodiment of the present invention by stipulating the detection of an overflow/underflow condition prior to its actual occurrence.

2.c. Elastic Buffer Control Circuitry

Figure 6:
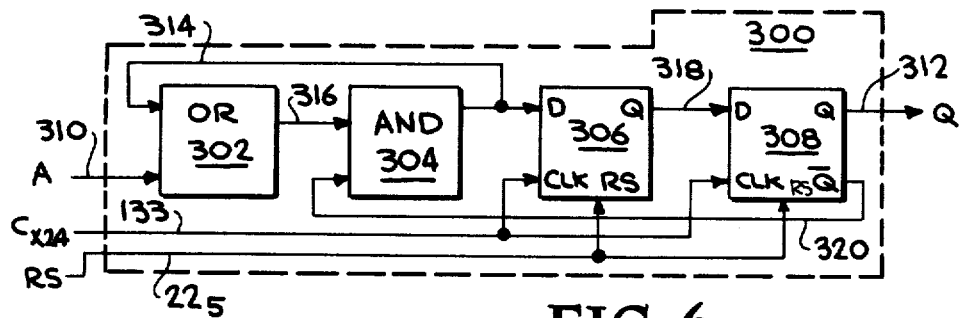
FIG. 6 is a block diagram of a preferred control signal data synchronizer constructed in accordance with the present invention.

Metastable states are of concern whenever a logic circuit must deal with asynchronous event inputs. The control circuitry, as shown in FIG. 7, must deal with the asynchronous occurrence of the cell array overflow/underflow signal as provided on line 352 of FIG. 4, as well as a normal operating condition that causes the initialization of the cell array 200 and the provision of a reset signal on line $22_5$ by the node controller 14. Consequently, the synchronization circuit shown in FIG. 6 is utilized in the control circuit of FIG. 7 to prevent the propagation of metastable states and resulting improper circuit operation. The synchronization circuit 300 of FIG. 6 utilizes OR gate 302 and AND gate 304 to latch an input signal provided on the A input line 310. Considering an initial state where no input signal is provided on the input line 310 and the a logic zero is present on the feedback line 314 that extends from the output of the AND gate 304 to an input of the OR gate 302, a logic zero will be present on the OR-AND 302, 304 interconnecting line 316 resulting in a stable logic condition with respect to the OR and AND gates 302, 304. An extended clock signal $Cx_{24}$ is provided on line 133 as the clock input to two series connected D flip-flops 306, 308. For purposes of the present invention, this extended clock signal $Cx_{24}$ preferably has a period three times longer yet otherwise synchronous with the clock signal CTx, CRx from which it is derived. The output of the AND gate 304 is provided as the input to the D flip-flops 306 that, in turn, provides its output on line 318 to the input of the second D flip-flop 308. At least initially, the data content of the two flip-flops 306, 308 are logic zeros resulting in the feedback of a logic one signal on line 320 from the complement output second D flip-flop 308 to an input of the AND gate 304.

Transition of the input signal on line 310 from a logic zero to a logic one results in the latching of the logic one as between the OR gate 302 and AND gate 304 at least until the logic state of the feedback signal provided to the AND gate 304 on line 320 changes. The output of the AND gate 304, however, is not clocked into the first D flip-flop 306 until the beginning of the next delayed clock signal $Cx_{24}$. Thus, the input signal on line 310 of the synchronizer 300 is provided a substantial time window to allow full decay or setting of a metastable state at the output of the AND gate 30. Consequently, the synchronizer 300 permits an input signal on line 310, though delayed by preceding logic stages and a potential phase difference between the receive and transmit clocks CRx, CTx, as well as the propagation and settling delay of the OR-AND latch 302, 304, to settle such that it is quite unlikely that a metastable condition will exist at the output of the AND gate 304 when the extended clock signal $Cx_{24}$ on line 133 clocks in the data present at the input of the D flip-flop 306. Further, the output of the flip-flop 306 is allowed the full period of the extended clock signal $Cx_{24}$ to settle precluding the possibility of propagating a metastable state to the output of the synchronizer circuit 300. In the iinmmediately subsequent extended clock cycle, the data output of the D flip-flop 306 is gates into the second D flip-flop 308 and made available on its output line 312. Simultaneously, the complementary output signal provided on line 320 rests the OR-AND latch circuit 302, 304. Consequently, while introducing a delay of slightly greater than one transmitter clock cycle, the synchronizer circuit 300 effectively blocks the propagation of metastable states between its input and output.

Considering now FIG. 7, the control circuitry as shown performs a variety of functions including initializing the read and write pointers 108, 112, resetting the flag cells 242 of the cell array 200 and insuring that the overflow/underflow condition detect signal provided on line 150 is only issued when a data packet is in transit through the buffer array 110.

Subcircuit 340 of the control circuit of FIG. 7 controls the issuance of the overflow/underflow signal on line 150 depending on the data status of the memory cells 240 of the cell array 200. Two particular status conditions are of significance. The first is where all of the memory cells 240 of the cell array 200 contain logic ones corresponding, in the preferred embodiment of the present invention, to the reception of a string of more than four idle line-state symbols from the network media. The second status condition is where all of the memory cells 240 of the cell array 200 contain logic zeroes corresponding to the reception, again in the preferred embodiment, of more than four quiet line-state symbols from the network media. Both the idle and quite line-state symbols are defined in Table I and their use will be described in greater detail below. Subcircuit 340 receives the data from all the memory cells 240 of the cell array 200 on their respective data out lines 224. These data out signals and their complements are utilized by the OR circuit 342 to produce an elastic buffer idle (EBIDLE) signal on line 346 whenever all of the data output lines 224 are at a logic one and an elastic buffer quiet (EBQUIET) signal on line 348 whenever all of the data output lines 224 are at logic zero. The invert of these two signals and the cell array overflow-/underflow (O/U) signal on line 352 are combined by the AND circuit 344 such that the output signal on line 350 is a logic one whenever the data present in the memory cells 240 of the cell array 200 are not representative of either an idle or quiet line-state and an overflow/underflow condition is detected within any cell unit $200_n$. The signal on line 350 is passed through a synchronizer circuit $300_1$ to finally provide the overflow/underflow OvUd signal on line 50 synchronized with respect to the transmitter clock signal CTx.

Subcircuit 354 provides for the initialization of the write pointer 108 and cell array 200 as a new data packet is serially received on the DI line 136, the temporary disabling of the overflow/underflow condition detection capability of the cell units $200_n$ during initialization and the effective termination of buffer operation on receipt of either a reset signal from the node controller 14 or the occurrence of a proper overflow/underflow (OvUd) condition. In particular, the AND gate 372 receives the complement of the current serial data bit present on DI line 136, the last previously received data bit on the DIx line 215 and the EBIDLE signal from line 346 of subcircuit 340 as inputs. The AND gate 372 thus determines whether reception of a new data packet is underway by sensing the first logic zero in the serial data stream when present on the DI line 136. That is, the AND gate 372 provides a new packet start signal on line 356 upon detection of the logic zero data bit as properly present in the third serial bit position of a J starting-delimiter symbol. The new data packet start signal on line 356 is provided to the OR gate 374 along with the normally low output signals from the subcircuits 390 and 400. The true output of the OR gate 374 provides the initialize signal INITWp, INITEB on line 146. This signal is utilized to rest the counter of the writer pointer 108 and to rest all of the flag cells 242 of the cell array 200 via the OR gate 246 as shown in FIG. 5. The new data packet start signal is also provided by the inverted output of the OR gate 374 on line 362 to the OR gate 380 where it effectively resets the OR-AND latch circuit 376, 382 so as to provide the disable elastic buffer R− (DISEBR−) signal on line 214. As shown in FIG. 4, the DISEBR− signal is provided to disable the R+ and R− selector circuits 206, 208 and thereby prevent status resetting and sensing of the flag cells 242 of the cell array 200 at least until the initialization of the buffer array 110 is completed. Initialization completion is indicated by the subsequent provision of the read pointer initialize signal INITRp on line 140 to the OR gate 376. With the OR-AND latch circuit 376, 382 reset, the feedback signal on line 215 is a logic zero. Thus, the INITRp signal on line 140 will set the OR-AND latch circuit 376, 382 and effectively remove the DISEBR- signal from line 214.

Subcircuit 390 is provided to provide a delayed reset signal to the OR gate 372 of subcircuit 354. This delayed reset signal is gnerated in response to a reset signal RS on line $22_5$ as provided by the node controller 14. The D flip-flop 392 clocks in the state of the reset line $22_5$ in response to the receiver clock signal CRx provided on line 132 thereto. The inverted output of the D flip-flop 392 is provided on line 402 to the OR gate 394, having as its other input the state of the reset signal on line $22_5$, which delays the application of the reset signal via line 358 until after the reset signal is relinquished.

The delayed rest signal is then applied by the OR gate 394 for the remaining portion of the current receiver clock period to the OR gate 374 of subcircuit 354. Since the reset signal is provided by line 22₅ as an additional input to the OR gate 380 of subcircuit 354, the DISEBR- signal on line 214 is asserted directly in response to the reset signal on line 22₅. However, application of the reset is effectively maintained by the operation of the subcircuit 390 until the conclusion of the current receiver clock cycle regardless of the asynchronous withdrawal of the reset signal by the node controller 14.

Subcircuit 400 provides for the ultimate issuance of the DISEBR- signal on line 214 of subcircuit 354 in response to an overflow/underflow condition as asynchronously detected by any of the cell units $200_n$ of the cell array 200. The O/U signal is provided on line 352 as may be present on the line 352 as provided to the synchronization circuit 300₂ where it is synchronized with respect to the $CR_{x24}$ clock signal. The output of the synchronization circuit 300₂ is then provided as an input on line 404 to both the D flip-flop 398 and the AND gate 396. The D flip-flop 398 provides its inverted output on line 406 as the second input to the AND gate 396. Thus, the otherwise asynchronous occurrence of the O/U signal on line 352 is synchronized with respect to the receiver clock signal CRx as provided to the D flip-flop 398 on line 80. As synchronized, the overflow/underflow detection signal is provided to the OR gate 374 via its input line 360.

Finally, subcircuit 410 functions to delay the initialization of the read pointer 112 for a period sufficient to allow the write pointer 108 to direct the writing of the minimum required number of serial data bits necessary to provide the desired elasticity in the buffer array 110. That is, the INITEB signal on line 146 occurring in response to the initial detection of a new data packet is provided to the synchronization circuit 300₃ where it is synchronized at least with respect to the extended transmitter clock signal $CT_{x24}$. The output of the synchronization circuit 300₃ is further synchronized by the D flip-flop 413 and the AND gate 414, similar to the respective components of the subcircuit 400, with the transmitter clock signal CTx. The resulting signal is provided by the AND gate 414 on its output line 426 to the three serially connected D flip-flops 416, 418, 420. The output of the last D flip-flops 420 in turn provides the read pointer initialize signal INITRp on line 140 to the counter of the read pointer 112 as shown in FIG. 3. Note that the synchronization circuit 300₃ and the D flip-flops 413, 416, 418, 420 combine to provide a total delay of six transmitter clock signal periods between the initialization of the write pointer 108 and the read pointer 112. Thus, the necessary elasticity of the buffer array 110 is established by the operation of the subcircuit 410.

An ancillary function of subcircuit 410 is performed by the set-reset flip-flop 422. This flip-flop 422 is set in response to the buffer array OvUd signal on line 150 and reset in response to the INITRp signal on line 140. The output of the flip-flop 422 provides a data state force (FRCE) on line 228 to the read selector circuit 210 of FIG. 4. The purpose of this FRCE signal is to disable the read selector 210 for the period of time following a buffer array overflow/underflow condition is detected until the initialization of the buffer array 110 is completed as signified by the occurrence of the INITRp signal on line 140. Consequently, serial data provided on the DO line 72 following an overflow/underflow condition but prior to full initialization of the buffer array 110 will be forced to a logical one corresponding to an idle line-state condition.

Figure 8:
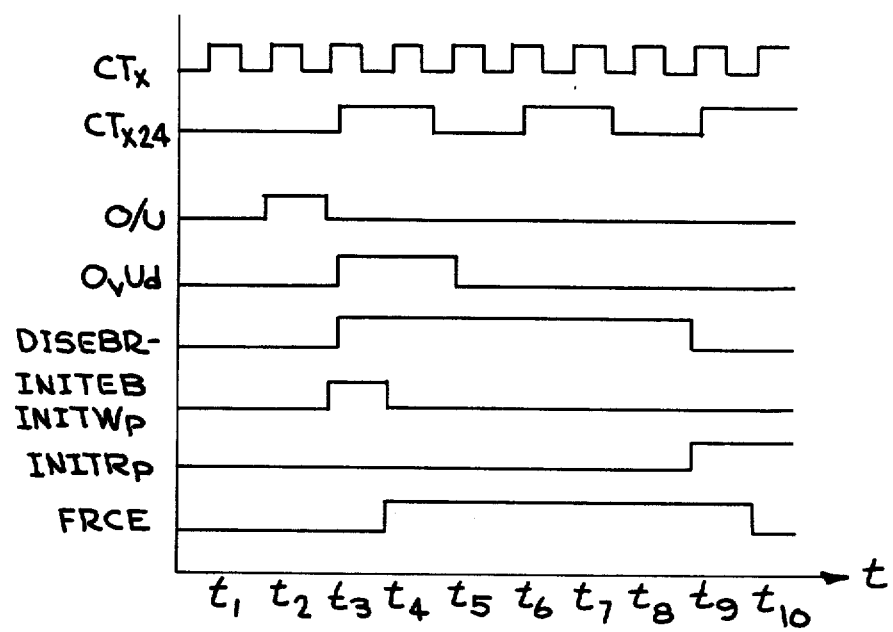
FIG. 8 is a timing diagram illustrating the overflow/underflow condition detection and recovery provided by the control circuitry shown in FIG. 7.

The significant waveform timing relationships of the control circuits shown in FIG. 4 are illustrated in FIG. 8. As shown, the occurrence of the cell array O/U signal during transmitter clock cycles $T_1-T_2$ results in the ocurrence of the buffer array OvUd during cycle $T_3$ synchronous with the extended transmitter clock signal $CT_{x24}$. The DISEBR− and INITEB/INITWp signals will also be asserted at this time. In response to the INITEB signal in particular, the INITRp signal is asserted six clock periods later, in clock period $T_9$ synchronous with the transmitter clock signal CTx. In turn, the FRCE signal, activated in clock period $T_4$ by the OvUd signal synchronous with the transmitter signal CTx, is reset at the beginning of cycle $T_{10}$ in response to the INITRp signal.

3. Clock Unit Detail

The clock unit 54, as shown in FIG. 3, may be of conventional design. Preferably, however, the clock unit 54 includes a clock phase-lock loop circuit 104 and a clock counter circuit 106. The clock phase-lock loop circuit 104 receives the system clock signal $\phi_{SYS}$ from line 120 and synchronously establishes a local clock signal TCLK on line 107 directly dependent on the resonant frequency of the crystal 105. Preferably the system clock signal $\phi_{SYS}$ is 12.5 MHz while the local clock signal TCLK is established synchronously at 125 MHz. The clock circuit 106 provides for the buffering of the local clock signal TCLK and in turn provides the transmitter clock signal CTx on its output line 80. Additionally, the clock circuit 106 provides the extended transmitter clock signal $CT_{x24}$ on its secondary output line 134. Preferably, this extended transmitter clock signal $CT_{x24}$, but otherwise synchronous with the transmitter clock signal CTx, has a period of approximately 24 nanoseconds. While an extended clock period of approximately two to four times the transmitter clock signal period are acceptable, an extended period of 24 nanoseconds, or three CTx periods, is preferred as an easily obtainable delay and as providing the synchronization circuit 300 with a substantial margin in the prevention of metastable states.

4. ENDEC Command Management Unit Detail

Referring to FIG. 2, the command management unit (CMT) 56 preferably is a low-complexity, otherwise conventional state machine that is responsive to the serial data provided by line 72, the CMTIN signals provided on control lines 22₃ and the bypass/loop-back control signals provided on the control lines 22₅. In response to these inputs, the CMT unit 56 provides multiplexer control signals on lines 82 status output signals on the CMTOUT lines 22₂ and selector control signals on the control lines 90 to the selector 64. These later control signals provide for selecting between the nominal parallel data provided on the data bus 88 and particular control symbols such as quiet, idle and halt.

Figure 9:
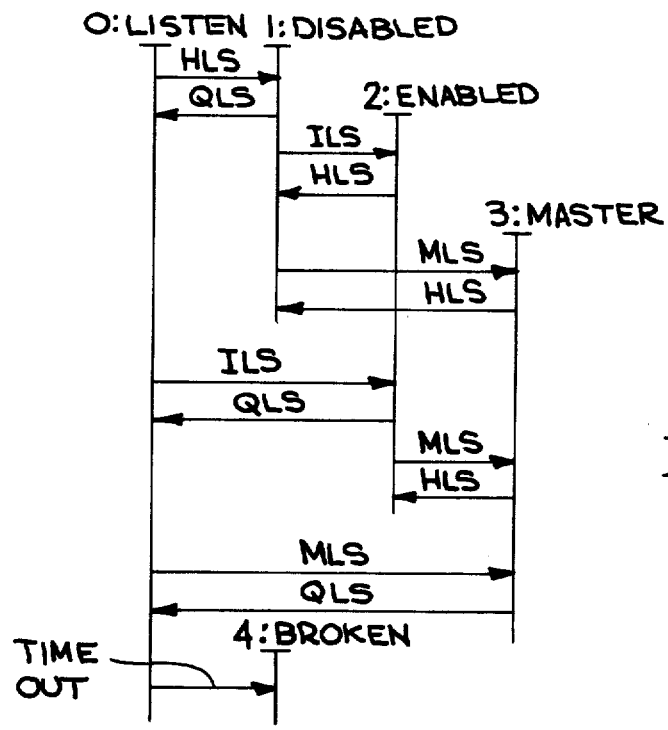
FIG. 9 is a line-state diagram of the control state function implemented in conjunction with the preferred embodiment of the present invention.

The state diagram of the state machine implemented the CMT unit 56 in the preferred embodiment of the present invention as shown in FIG. 9. The CMT unit 56 is utilized to cycle the ENDEC 12 through a number of discrete states by the invocation of certain primitive protocols of the preferred local area network protocol. Upon initialization of the ENDEC 12, the CMT unit 56 is in a zero or listen state as indicated in FIG. 9. As noted above, the node controller 14 may direct the CMT unit 56 to execute the primitive protocols to become active on the local area network as a peer, master or slave unit with respect to the other nodes on the network. Thus, the CMT unit 56 receives its initial state change request from the node controller 14 via the CMTIN lines 22₃. In response to a node controller 14 state change request that, for example, the ENDEC 12 act as a peer unit, the CMT unit 56 begins executing a primitive protocol to establish itself on the network. In response, controlling the ENDEC 12 issues a series of halt line-state symbols onto the network. At the beginning of this transmission, a dedicated timer within the CMT unit 56 is initialized to establish a maximum time-frame within which the preferred protocol stipulates that a specific reply must be received in order for the CMT unit 56 to cycle out of the current state and into its target state. Thus, the CMT unit 56 may issue a series of halt line-state symbols and, prior to the time out of the dedicated timer, begin receiving halt line-state symbols from the network. The CMT unit 56, receives any line-state symbols returned by the network via serial line 72. Reception of halt line-state symbols, results in a transition to the state one or disabled state of operation. The CMT unit 56 will then reinitialize the dedicated timer and select idle line-state symbols for transmission onto the network. If idle line-state symbols are in turn received, then the CMT unit 56 will cycle forward the enabled state, as indicated in FIG. 9. At this point, the ENDEC 12 has succeeded in executing the primitive protocols necessary to become active as a peer node on the local area network.

The condition or state of the CMT unit 56 is preferably reported continuously to the node controller 14 via the CMTOUT control lines 22₂. Should the CMT unit 56, at any time, detect the transmission of quiet line-state symbols over the local area network, the CMT unit 56 will immediately cycle from its current state back to the zero or listen state. With this transition, the state of the CMTOUT status lines 22₂ will be appropriately modified.

Preferably, the CMTOUT status lines further indicate the status of the CMT unit 56 with regard to whether it has failed to obtain a proper acknowledgement of the node 10 presence on the local area network. That is, in response to the issuance of halt line-state symbols, only quiet line-state symbols were received until the time out of the dedicated CMT unit timer. As indicated in FIG. 9, these particular circumstances correspond to a transition to the broken state 4.

Also as shown in FIG. 9, the preferred CMT unit 56 state machine permits transitions from any lower state to any higher state, including the master state three. The master state three is obtained by the CMT unit 56 in response to an appropriate request from the node controller 14 on the CMTIN lines 22₃. Preferably, the select circuit 64 generates and selects an alternating sequence of halt and idle line-state symbols for transmission onto the network. In turn, reception of master line-state symbols, i.e., the same alternating sequence of halt and idle line-state symbols, from the network permits the CMT unit 56 to cycle forward to the master state three. Any subsequent reception of halt line symbols will cause the CMT unit 56 operating in the master state three to cycle back to its disabled state one or enabled state two. Should quiet line-state symbols be received, however, the CMT unit 56, preferably, will cycle from the master state three directly back to the listen state zero.

The preferred operation of the CMT unit 56 of the ENDEC 12 in accordance with the above description, thus operates in accordance with at least the proposed physical layer standard protocol established by the American National Standard Committee, Technical Committee X3T9.5 as of June 1, 1984 and set forth in Rev. 5 of its draft report of the same date.

IV. Summary

Thus, a data stream synchronizer for adjusting the rate of transfer of a data stream between its rate of reception and a desired data read rate has been described. The data stream synchronizer provides for the reliable determination of overflow/underflow fault conditions while completely avoiding the occurrence of data metastable logic states. The described synchronizer with respect to events occuring synchronous with both the received data and the data, in turn, provided at the data read rate. This control of the synchronizer is accomplished with substantially complete prevention of the occurrence of metastable logic states and full protection against their propogation through any part of the data rate synchronizer.

From the foregoing discussion of the many aspects of the present invention as exemplified by its preferred embodiment, it is readily apparent that many modifications and variations are possible and may be resorted to by those skilled in the art without departing from the nature and scope of the present invention. It is therefore to be understood that, within the scope of the appended claims, the invention may be practiced otherwise than is specifically described.

I claim:

1. An elastic buffer receiving a first data stream at a first predetermined rate, converting said first data stream to a second data stream at a second predetermined rate, and providing said second stream, said elastic buffer generating a stable buffer overflow/underflow signal, said elastic buffer comprising:
   a source of clock signals;
   means for generating a plurality of first and a plurality of second read select signals and a plurality of write select signals;
   a plurality of addressable storage means connected to said read/write select means each for storing said received data when a predetermined one of said first plurality of read signals is received and for generating signals indicative of said stored data when a predetermined one of said plurality of write signals is received;
   wherein said plurality of addressable storage means have addresses arranged in linear numerical order, a currently-read storage means having adjacent storage means corresponding to a storage means last-read and to a storage means next-to-be-read, a second plurality of read select signals corresponding to said currently-read storage means, a first plurality of read select signals corresponding to said last-read storage means, and a third plurality of read select signals corresponding to said next-to-be-read storage means;
   a plurality of addressable means connected to said read/write select means and each connected to a predetermined one of said plurality of addressable storage means for generating a bi-level flag signal (Fn) indicative of whether a read or a write was most recently performed on said storage means connected to said flag means; and means for generating said stable buffer overflow-/underflow signal including a plurality of overflow/underflow logic means each receiving said flag (Fn) signal from a predetermined one of said flag means, a predetermined one of said plurality of first read signals and a predetermined one of said plurality of second read signals, and a predetermined one of said write signals for generating a write overflow signal when said flag Fn signal is at a first predetermined level and said write signal is received, and, for generating a read underflow signal when said flag F signal is at a second predetermined level and said second read select signal is received.

2. An elastic buffer according to claim 1 wherein each of said plurality of flag means further receives a signal at a reset terminal and responsive thereto generates said flag signal (Fn) at said second predetermined level, said read/write select means further generates said plurality of third read select signals each conducted to a predetermined one of said flag means reset terminal, and each said overflow/underflow logic means further generates an overflow/underflow signal when said predetermined one of said plurality of write select signals is received and said predetermined one of said plurality of third read select signal is received.

3. An elastic buffer according to claim 2 wherein each said flag means comprises a flip-flop having a set terminal receiving said predetermined write select signal, having a reset terminal comprising said flag means reset terminal, and output terminal generating said flag (Fn) signal and a data terminal connected to said output terminal, and wherein each said overflow/underflow logic means comprises:

- a first AND gate receiving at a first input said predetermined one of said write select signals and at a second input said flag (Fn) signal generated by said flip-flop, and generating therefrom a true signal;
- a second AND gate receiving at a first input the complement of said flag (Fn) signal generated by said flip-flop and a second input said predetermined one of said second read select signals, and generating therefrom a true signal; and
- an OR gate receiving at a first input said signal generated by said first AND gate and at a second input said signal generated by said second AND gate, and generating therefrom said signals generated by said overflow/logic means.

4. An elastic buffer according to claim 1 or claim 2 further including overflow/underflow control means receiving said signals generated by said plurality of overflow/underflow logic means, receiving a clock signal having a period extended with respect to that of said source clock signal, and said stored data signals generated by said plurality of addressable storage means for generating said stable buffer overflow/underflow signal, said overflow/underflow control means comprising:

- means receiving said signals generated by said plurality of overflow/underflow logic means for generating therefrom a buffer overflow/underflow signal if at least one of said received signals indicates a write overflow, read underflow or overflow/underflow condition;
- a first OR gate having a plurality of first inputs and second inputs receiving at a predetermined one of said first inputs a predetermined one of said stored data signals, at a predetermined one of said second inputs the complement of said predetermined stored data signal and generating therefrom true and complemented signals;
- a first AND gate receiving at a first input the complement of said true signal generated by said first OR gate, at a second input the complement of said complemented signal generated by said first OR gate and at a third input said buffer overflow/underflow signal and generating therefrom a true signal; and
- means receiving said extended clock signal and said signal generated by said AND gate, generating therefrom said stable buffer overflow/underflow signal.

5. An elastic buffer according to claim 4 wherein said stable buffer overflow/underflow signal generating means comprises:

- a second OR gate receiving at a first input said signal generated by said first AND gate and having a second input, and generating therefrom a true signal;
- a second AND gate receiving at a first input said signal generated by said second OR gate and having a second input, and generating therefrom a true signal; said signal conducted to said second input of said second OR gate;
- a first D-type flip-flop receiving at a data (D) input said signal generated by said second AND gate, receiving at a clock input said extended clock signal, and generating therefrom at a true (Q) output a signal indicative of the applied data signal at the most-recently received clock; and
- a second D-type flip-flop receiving at a data (D) input said signal generated by said first flip-flop, receiving at a clock input said extended clock signal, and generating therefrom at a true (Q) output a signal indicative of the applied data signal at the most-recently received clock, and at a complemented ($\sim$Q) output a signal the complement of said signal generated at a said true output, said complemented signal conducted to said second input of said second AND gate;

wherein said stable buffer overflow/underflow signal is generated at said true output of said second flip-flop.

6. An elastic buffer according to claim 1 wherein said plurality of storage means have addreses arranged in a linear numerical order, a currently-read storage means having an adjacent storage means corresponding to a storage means last-read, said second plurality of read select signals corresponding to said currently-read storage means and said first plurality of read select signals corresponding to said last-read storage means.

7. A method of detecting potential overflow/underflow in an elastic buffer receiving a first data stream at a first predetermined rate, converting said first data stream to a second data stream at a second predetermined rate, and providing said second stream, said elastic buffer including means for generating a plurality of first, a plurality of second and a plurality of third read select signals and a plurality of write select signals; a plurality of addressable storage means connected to said read/write select means each for storing said received data when a predetermined one of said first plurality of read signals is received and for generating a signal indicative of said stored data when a predetermined one of said plurality of write signals is received; wherein said plurality of addressable storage means have addresses arranged in linear numerical order, a currently-read storage means having adjacent storage means corresponding to a storage means last-read and to a storage means next-to-be-read, said second plurality of read select signals corresponding to said currentlyread storage means, said first plurality of read select signals corresponding to said last-read storage means, and said third plurality of read select signals corresponding to said next-to-be-read storage means; a plurality of addressable means connected to said read/write select means and each connected to a predetermined one of said plurality of addressable storage means for generating a bi-level flag signal (Fn) indicative of whether a read or a write was most recently performed on said storage means connected to said flag means, comprising the steps of:

(a) generating a write overflow signal when said write select signal is received at one of said addressable storage means and said flag signal Fn is at a first predetermined level;

(b) generating a read underflow signal when said second read select signal is received at one of said addressable storage means and said flag signal Fn is at a second predetermined level; and (c) generating an overflow/underflow signal when said third read select signal is received at one of said addressable storage means and said predetermined one of said plurality of write select signals and said predetermined one of said plurality of said third read select signals is received.

8. An overflow/underflow detection method according to claim 7 further including the steps:

(d) generating an elastic buffer idle signal when all said signals indicative of said stored data of said plurality of storage means are at a first predetermined level;

(e) generating an elastic buffer quiet signal when said signals indicative of said stored data of said plurality of storage means are at a second predetermined level;

(f) generating a buffer overflow/underflow signal when at least one of said signals is generated at step (a), step (b) or step (c) for any of said plurality of storage means; and (g) generating a stable buffer overflow/underflow signal when said elastic buffer idle signal and said elastic buffer quiet signal are not generated and said buffer overflow/underflow signal is generated.

9. An overflow/underflow detection method according to claim 8 wherein said elastic buffer has a source of timing clock signals having a predetermined period and wherein step (g) comprises the steps:

(g1) generating a signal when said elastic buffer idle signal and said elastic buffer quiet signal are not generated and said buffer overflow/underflow signal is generated;

(g2) holding said signal generated at step (g1) for a period greater than said timing clock signal; and (g3) generating said stable buffer overflow/underflow signal generated at step (g1).

* * * * *